United States Patent
Fields et al.

(12) United States Patent (10) Patent No.: US 7,219,299 B2
(45) Date of Patent: May 15, 2007

(54) METHOD FOR BLOCKING DEREFERENCING ELEMENTS IN MESSAGES

(75) Inventors: Brendan Clarke Fields, Bellevue, WA (US); Karim Michel Batthish, Seattle, WA (US); Yuriy Mikhailovich Inglikov, Bellevue, WA (US); Jorge Pereira, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 437 days.

(21) Appl. No.: 10/717,004

(22) Filed: Nov. 19, 2003

(65) Prior Publication Data

US 2005/0108639 A1    May 19, 2005

(51) Int. Cl.
    *G06F 17/21* (2006.01)
(52) U.S. Cl. ....................................... 715/531
(58) Field of Classification Search ................ 715/531
    See application file for complete search history.

(56) References Cited

U.S. PATENT DOCUMENTS

| | | | |
|---|---|---|---|
| 5,790,793 A * | 8/1998 | Higley | ........................ 709/218 |
| 6,571,295 B1 | 5/2003 | Sidana | |
| 2004/0054887 A1 | 3/2004 | Paulsen, Jr. et al. | |
| 2004/0096055 A1 | 5/2004 | Williams et al. | |
| 2004/0254918 A1 | 12/2004 | Pereira et al. | |
| 2005/0021969 A1 | 1/2005 | Williams et al. | |

2005/0050222 A1    3/2005    Packer

OTHER PUBLICATIONS

GalaxyTrading.net, "GalaxySpy; Monitor & Secure Your Internet Connectivity," Oct. 2, 2002, downloaded from: http://web.archive.org/web/20021022309 17/www.galaxytrading.net/galaxyspy.jsp. pp. 1-2.*
Wilcox, J., "New Outlook to Give Spammers the Boot," CNET News.com, Nov. 1, 2002, published on the Internet at: http://news.com/New+Outlook+to+give+spammers+the+boot/2100-1001_3-964166.html, downloaded pp. 1-3.*

(Continued)

*Primary Examiner*—Doug Hutton
(74) *Attorney, Agent, or Firm*—Senniger Powers (57) ABSTRACT

Disclosed is a policy based method for blocking the automatic dereferencing of web beacon links in an e-mail message sent in HTML format with a minimum sacrifice in the HTML body rendering quality. HTML content that potentially contains web beacons is replaced with non-dereferencing elements prior to HTML rendering by the e-mail browser so that the remaining HTML can be rendered as complete as possible without rendering the potential web beacons. Additionally, the present invention also provides a method for removing the HTTP Referer header from referenced external links and activated images. An HTTP redirector service is implemented as a server-based link redirection evaluator application which serves to eliminate the Referer header for the URL requested. Embodiments of the present invention provide for blocking web beacons and removing HTTP Referer headers in both a "down-level" e-mail client and a client which can make programmatic use of an HTML rendering engine.

19 Claims, 6 Drawing Sheets

OTHER PUBLICATIONS

GalaxyTrading.net, "GalaxySpy," Press Release. Oct. 3, 2002, last downloaded by the Examiner on Mar. 19, 2006 from: http://web.archive.org/web/20021003034642/www.galaxytrading.net/press/releases.jsp, 1 page.*

Gouthro, L., "Review: Tool protects and educates Web surfers," CNN.com, Feb. 5, 2002, pp. 1-2.*

Bruce, B., "Our WebWasher Workshop," downloaded by the Examiner on Sep. 9, 2006, from: web.archive.org, with pp. dating prior to Nov. 19, 2002, downloaded pp. 1-95.*

"Removing adverts from web pages," Flourish.org, published on the Web as of Oct. 3, 2002, downloaded by the Examiner on Sep. 4, 2006, from: http://web.archive.org/web/20021003023544/http://www.flourish.org/adremove, pp. 1-6.*

Microsoft Entourage:mac 2004, "Reward Your Inner Task Master," Copyright 2005 Microsoft Corporation, 2 pages.

Sentrybay® Leaders in Virus and Spam Protection, "Inbox 100™ for Home and Small Business," 6 pages.

Network Security Corp. (NSEC), Copyright 2005, "Spam Filtering," Network Security Corp., 3 pages.

MX Logic, "MX Logic Product Fact Sheet, Email Defense Service," 3 pages.

Network Working Group, "MIME Encapsulation of Aggregate Documents, such as HTML. (MHTML.)," 28 pages.

* cited by examiner

METHOD FOR BLOCKING DEREFERENCING ELEMENTS IN MESSAGES

TECHNICAL FIELD

The present invention relates generally to e-mail systems and, more particularly, to e-mail systems which render hypertext mark-up language (HTML) content.

BACKGROUND OF THE INVENTION

E-mail systems are ubiquitous in the landscape of today's communication infrastructures. Unfortunately as e-mail communications have become more prevalent so too have unsolicited mass e-mailings, commonly referred to as junk e-mail. Typically a junk e-mail sender will send hundreds of thousands of e-mails to random e-mail addresses in the hope that these unsolicited messages will be opened and read by the unwitting recipients.

Increasingly e-mail systems have incorporated functionality that allows messages sent in HTML to be rendered and viewed within the e-mail application. Sending e-mail messages as HTML is particularly attractive as it allows for the body of the e-mail to be displayed as it would appear in a web browser, thus allowing for the incorporation of, for example, externally hosted image files and navigable hyperlinks.

Typically, when an e-mail client application renders the HTML page it automatically downloads pictures and other "inline" content referenced within the HTML page at the time of rendering. For example, an e-mail message sent as HTML contains a number of HTML defined "elements", such as <A> (anchor tag) or IMG (image tag). HTML elements have "attributes" which may be used to modify the interpretation of the element. HTML elements and attributes are used by the web browser (i.e., e-mail client application) to correctly format and render the HTML page. One particular type of element that the HTML may contain is an image tag which indicates that an image is to be displayed within the rendered page. The image can be specified in the tag as being hosted on an external server which can be referenced through the Internet. As the e-mail client renders the HTML in the e-mail message it will process the various HTML elements at the time the page is rendered. Thus, when the e-mail client renders the page, the image specified, and other external content specified, by the image tag will be obtained from the external server so that it may be included in the HTML page as displayed. Other examples of elements and attributes which automatically obtain external content are BACKGROUND, BGSOUND, and stylesheet LINK.

While the ability to send an e-mail message with an HTML body and to have the message rendered in an e-mail client is beneficial, junk e-mail senders have unfortunately seized on the inherent features of this functionality to develop a technique which enables them to detect "live" e-mail addresses and opened/read e-mail. Through the use of a "web beacon"—a link in the HTML body of an e-mail message that is automatically dereferenced by an e-mail client program while rendering the body and that contains unique information allowing for identification of the message recipient and the instance or version of the message itself—junk e-mail senders can detect that the recipient has actually opened the message. This information allows junk e-mail senders to validate the validity of recipient's e-mail address, effectively behaving as the equivalent of an e-mail read receipt, and thus collect statistical information without any control or knowledge by the person who is the junk e-mail target (while e-mail has the concept of a read receipt the recipient has the ability to suppress the sending of the response whereas this mechanism circumvents such an ability).

In addition when an e-mail message sent as HTML is rendered by the e-mail client (i.e., a server-generated HTML page), referenced external images and activated links will cause most browsers to include an HTTP Referer header. This optional header field allows the client to specify, for the server's benefit, the address (URL) of the document (or element within the document) from which the URL in the request was obtained. In case of a web-based e-mail client, the original document is basically the message in the client's mailbox on the server, hence its URL usually contains the server name and mailbox name, as well as the message subject as the resource name. Thus, it is possible for a moderately astute junk e-mail sender to send mail with links and images linking to their site in an effort to comb their web logs and determine a user's server name, a user's e-mail address, and the subject of the mail in which the user clicked on a link.

SUMMARY OF THE INVENTION

In view of the foregoing, the present invention provides a policy-based method for blocking the automatic dereferencing of web beacon links with a minimum sacrifice in the HTML body rendering quality. HTML content that potentially contains web beacons is replaced with non-dereferencing elements prior to HTML rendering by the e-mail browser so that the remaining HTML can be rendered as complete as possible without rendering the potential web beacons.

Additionally, the present invention also provides a method for removing the HTTP Referer header from referenced external links and activated images or other linked content. An HTTP redirector service is implemented as a server-based link redirection evaluator page which serves to eliminate the Referer header for the URL requested.

Embodiments of the present invention provide for blocking web beacons and removing HTTP Referer headers in both a "down-level" e-mail client and a client which can make programmatic use of an HTML rendering engine (e.g., a web-browser based client that uses downloaded binary controls for enhanced functionality). In the case of the down-level e-mail client, it is an e-mail client which runs on any web browser and operating system platform and does not require a separate e-mail client program (i.e., the web browser is reused as e-mail client). In this embodiment the e-mail client requires no code on the client side other then the general purpose web browser and the whole message view form is rendered in the client web browser as an ordinary HTML page that includes any necessary HTML controls and the message body content. Such architecture implies that the e-mail server has virtually no control over the client software rendering the message content. Thus, in order to be able to block any undesired content the HTML body is filtered on the server before supplying it into the message view form.

In the case of a client which can make programmatic use of an HTML rendering engine, the e-mail client receives the complete unfiltered message in MIME format and the MIME parsing and HTML decoding takes place on the client side. In this architecture the server has no control over the content of a body rendered by the client. Thus, the browser's own object model can be used to parse and filter the HTML.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

I. Exemplary Environment

Figure 1:
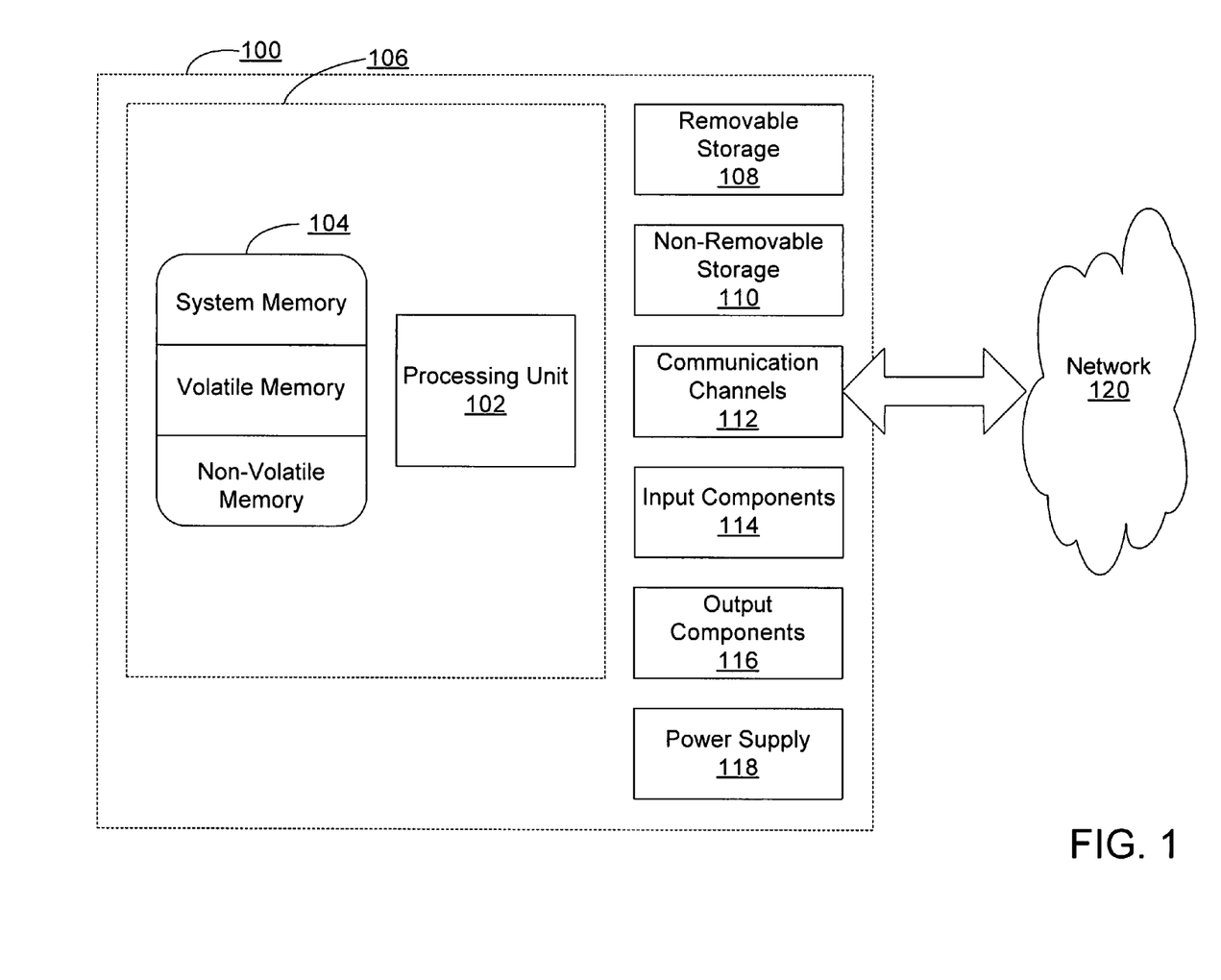
FIG. 1 is a schematic diagram of an exemplary computer architecture on which the method of the invention can be implemented.

Referring to FIG. 1, the present invention relates to communications between network nodes on connected computer networks. Each of the network nodes resides in a computer that may have one of many different computer architectures. For descriptive purposes, FIG. 1 shows a schematic diagram of an exemplary computer architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 1. The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing device 100 typically includes at least one processing unit 102 and memory 104. The memory 104 may be volatile (such as RAM), non-volatile (such as ROM and flash memory), or some combination of the two. This most basic configuration is illustrated in FIG. 1 by the dashed line 106.

Computing device 100 can also contain storage media devices 108 and 110 that may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing device.

Computing device 100 can also contain communication channels 112 that allow it to communicate with other devices. Communication channels 112 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media. The computing device 100 may also have input components 114 such as a keyboard, mouse, pen, a voice-input component, and a touch-input device. Output components 116 include screen displays, speakers, printers, and rendering modules (often called "adapters") for driving them. The computing device 100 has a power supply 118. All these components are well known in the art and need not be discussed at length here.

Figure 2:
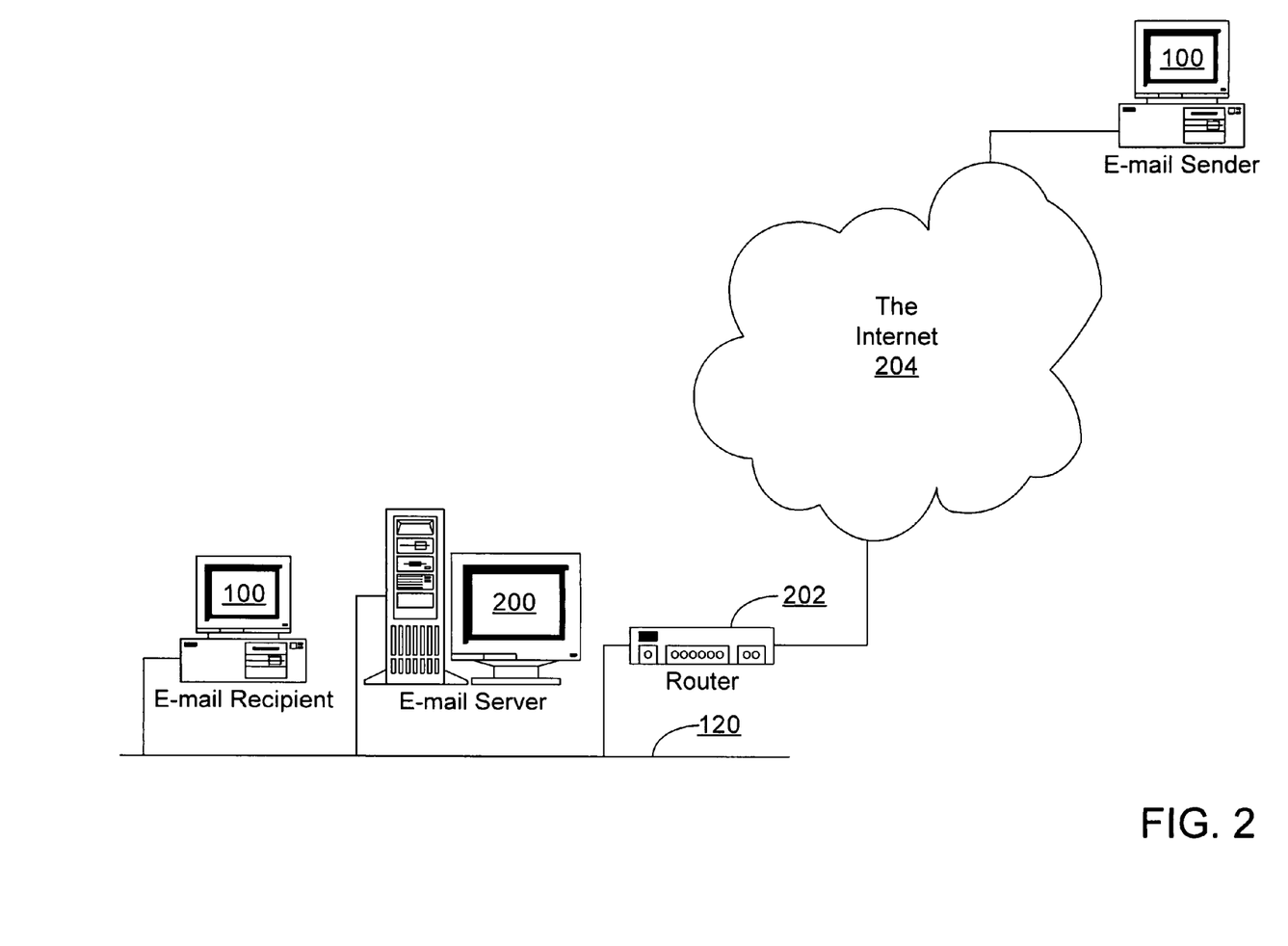
FIG. 2 is a schematic diagram showing an exemplary communications network in which the method of the invention can be practiced.

Turning to FIG. 2, accompanying a computing device 100 on a local area network (LAN) 120 is a server 200 and a router 202. The router allows the devices on the LAN to communicate over an internetwork 204 to remote computing devices 100. The Internet is one example of an internetwork.

In the case of the present invention, the server 200 is an e-mail server and the computing device 100 is an e-mail client or an e-mail sender. The present invention is directed to a method for blocking dereferencing elements in messages. A typical scenario will be detailed below in which an e-mail sender 100 (i.e., possible junk e-mail sender) can send a message (not pictured) containing dereferencing elements via the Internet 204 to a user's e-mail account located on the e-mail server 200. The message can then be accessed by the e-mail recipient 100 from their e-mail account located on the e-mail server 200 via the LAN 120 or Internet 204.

II. Dereferencing of Elements in a Message

Figure 3:
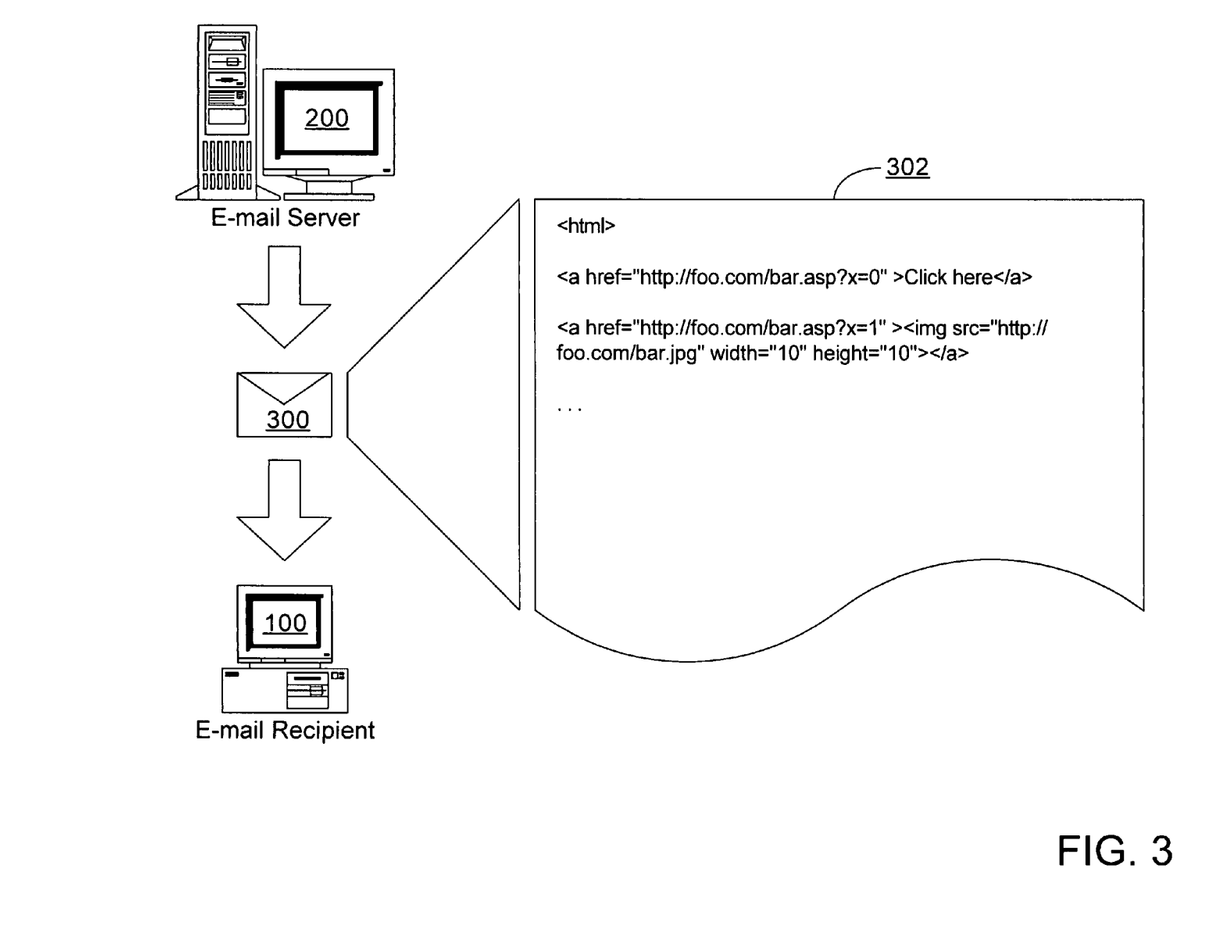
FIG. 3 is a schematic diagram showing an e-mail message being sent in HTML from a server to a client.

Referring to FIG. 3, an exemplary e-mail system architecture is represented. In the simplest case, a user wishing to read a delivered e-mail message 300 would open an e-mail client application on the computing device 100. Upon starting, the e-mail client application establishes a connection with the e-mail server 200 via the Internet or possibly some other wide area network (WAN) or LAN. The user can then select the message 300 to be downloaded, from the messages stored on the e-mail server 200, and the content of the e-mail message 300 is displayed for reading by the e-mail client application.

Increasingly e-mail systems have incorporated functionality that allows messages sent in HTML to be rendered and viewed within the e-mail client application. Sending e-mail messages as HTML is particularly attractive as it allows for the body of the e-mail to be displayed as it would appear in a web browser, thus allowing for text formatting capability as well as the incorporation of, for example, externally hosted image files and navigable hyperlinks.

Typically, when an e-mail client application renders the HTML page it automatically downloads pictures and other "inline" content referenced within the HTML page at the time of rendering. As illustrated in FIG. 3, the e-mail message body 302 is an HTML document containing a number of HTML elements which are used by the web browser (i.e., e-mail client application) to correctly format and render the HTML page. One particular type of element that the HTML e-mail message body 302 may contain is an image element (e.g., <img src="http://foo.com/bar.jpg-"width="10" height="10">) which indicates that an image is to be displayed within the rendered page. As illustrated in the above example, the image can be specified in the element as being hosted on an external server which can be referenced through the Internet.

Figure 4:
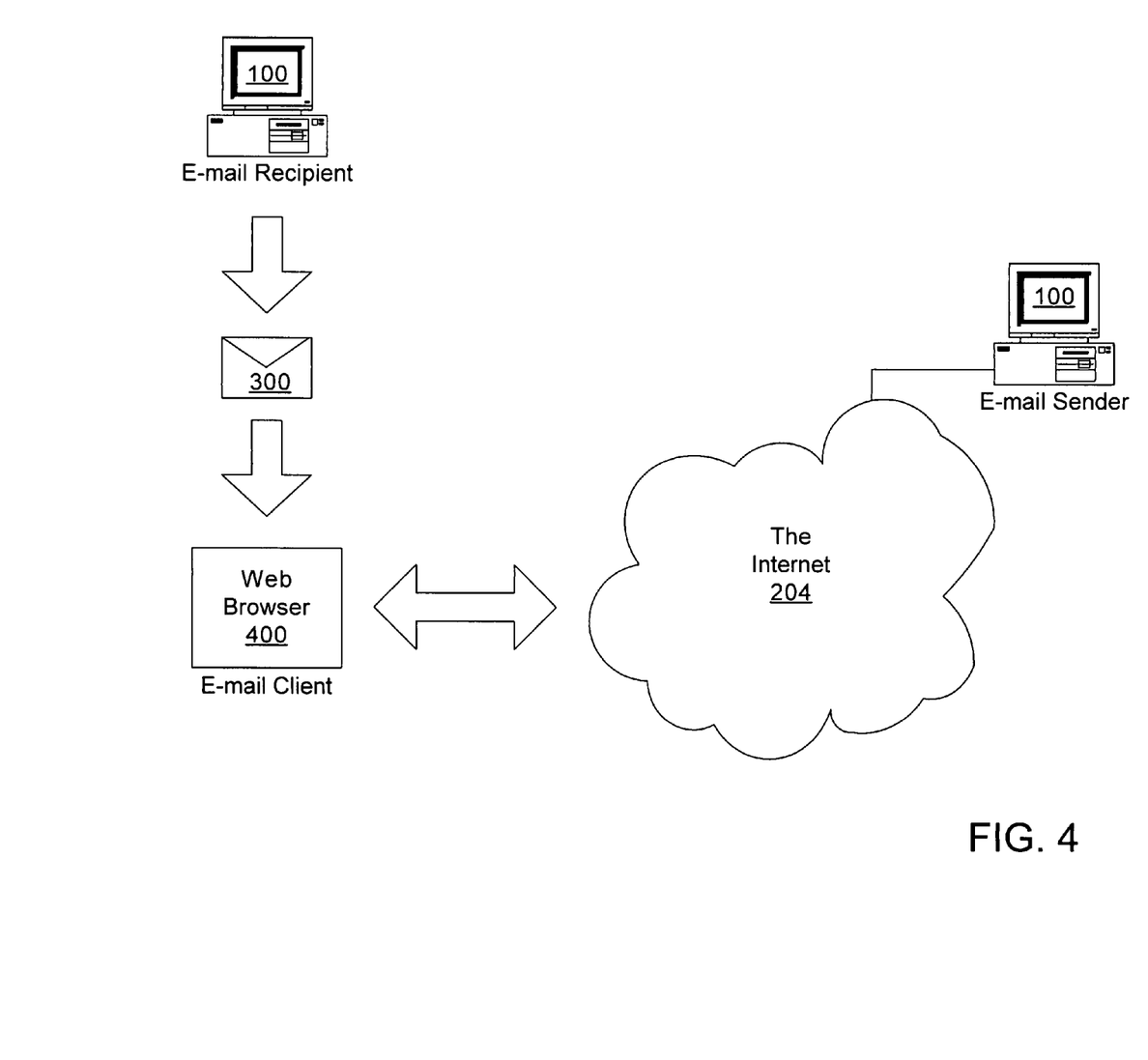
FIG. 4 is a schematic diagram showing an e-mail message being rendered by a web browser.

Turning to FIG. 4, the e-mail rendering process is illustrated. As the e-mail client 400 renders the HTML in the e-mail message 300 it will process the various HTML elements at the time the page is rendered. Thus when the e-mail client 400 renders the page, the image specified by the image element will be obtained, via the Internet 204, from the external server (i.e., the e-mail sender 100) so that it may be included in the HTML page as displayed in the e-mail client's web browser 400.

While the ability to send e-mail messages as HTML and to have the messages rendered in an e-mail client is beneficial, junk e-mail senders have unfortunately seized on the inherent features of this functionality to develop a technique which enables them to detect "live" e-mail addresses and opened/read e-mail. Through the use of a "web beacon"—a link in the HTML body of e-mail message that is automatically dereferenced by an e-mail client program while rendering the body and that contains unique information allowing for identification of the message recipient—junk e-mail senders can detect that the recipient has actually opened the message. This information allows junk e-mail senders to validate a recipient's e-mail address, effectively behaving as the equivalent of an e-mail read receipt without privacy control, and collect statistical information without any control or knowledge by the person who is the junk e-mail target.

In addition when an e-mail message sent as HTML is rendered by a web browser-based e-mail client, referenced external images and activated links will cause most browsers to include an HTTP Referer header. This optional header field allows the client to specify, for the server's benefit, the address (URL) of the document (or element within the document) from which the URL in the request was obtained. In case of a web-based e-mail client, the original document is basically the message in the client's mailbox on the server, hence its URL usually contains the server name and mailbox name, as well as the message subject as the resource name. Thus, it is possible for a moderately astute junk e-mail sender to send mail with links and images linking to their site in an effort to comb their web logs and determine a user's server name, a user's e-mail address, and the subject of the mail in which the user clicked on a link.

III. Blocking Web Beacons and Removing HTTP Referer Headers In a "Down-level" E-mail Client In one embodiment, the method of the present invention provides for blocking web beacons and removing HTTP Referer headers in a "down-level" e-mail client. A down-level e-mail client is an e-mail client which runs on any web browser and operating system platform and does not require a separate e-mail client program (i.e., the web browser is reused as e-mail client). In this embodiment the e-mail client requires no code on the client side other than the general purpose web browser and the whole message view form is rendered in the client web browser as an ordinary HTML page that includes any necessary HTML controls (i.e., any necessary scripts) and the message body content. Such an architecture implies that the e-mail server has virtually no control over the client software rendering the message content. Thus, in order to be able to block any undesired content the HTML body is filtered on the server before supplying it into the message view form.

Figure 5:
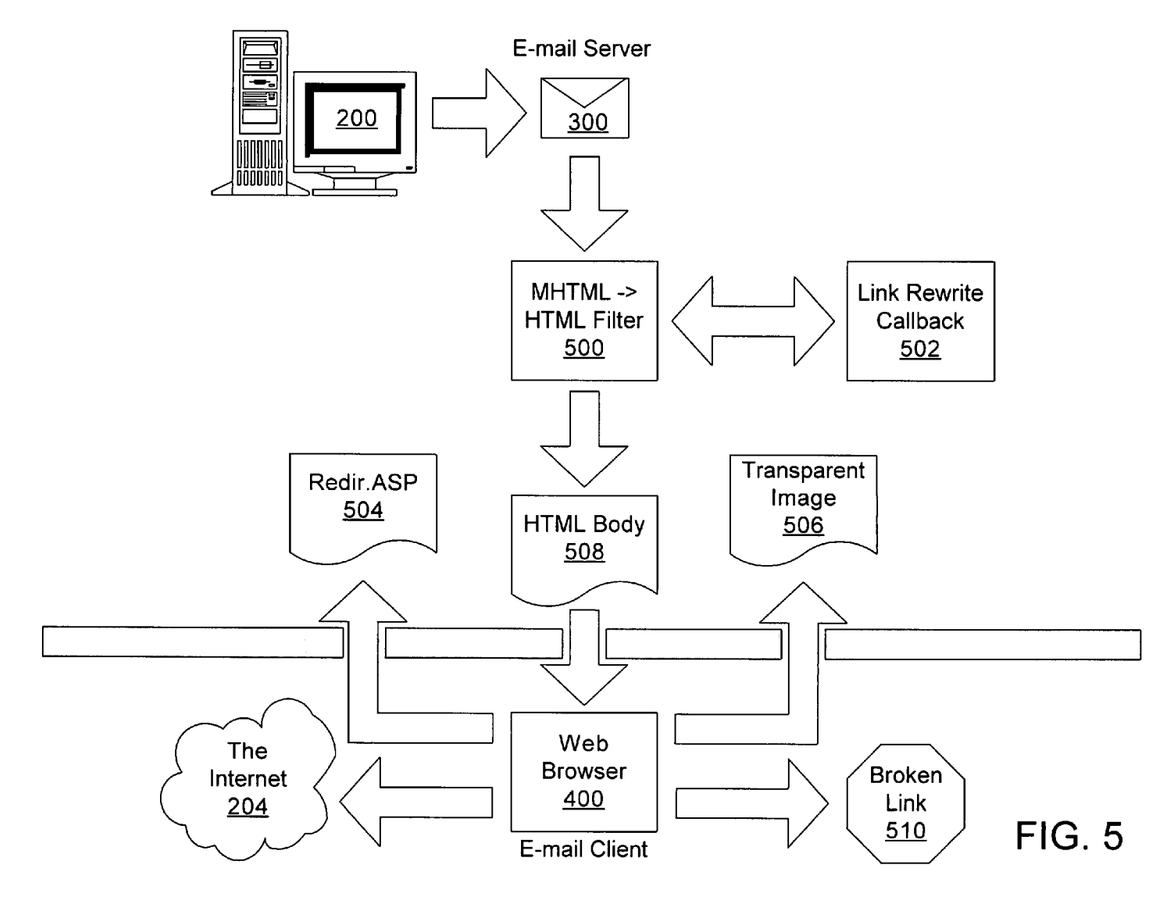
FIG. 5 is a data flow diagram illustrating the method of blocking dereferencing elements in a down-level e-mail client.

Turning to FIG. 5, the method for blocking web beacons and removing HTTP Referer headers in a "down-level" e-mail client is illustrated. The e-mail message 300 is stored on the e-mail server 200 in the message recipient's mailbox. As is known in the art, when a message that is to be displayed as HTML is sent, at a minimum the message is sent in a MIME e-mail message. Such a format generally cannot be directly consumed by a web browser. On some occasions, the HTML message body part may be in the format of MHTML, that is, a part in a multipart/related MIME structure. In this case, there is additional decoding work that should be done. Whether the message arrives with a single HTML part in the message or as multipart message containing HTML a transformation is performed. When the e-mail recipient selects the e-mail message 300 to be opened, the message is input to an MHTML to HTML converter 500 on the server to prepare the HTML body 508 to be sent to the e-mail client web browser 400.

In the method of the present invention, the MHTML to HTML converter code is modified to support callbacks which can be used to rewrite each link in the HTML message body. The callback code 502, depending on the current policy has the choice to pass the link through unmodified, to block (break) the link, to redirect it to some other link, or to put it through the HTTP redirector service on the server 504.

In a relaxed security policy setting, original links can be passed through unmodified, allowing external content (e.g., images, sounds, etc.) to be obtained and also allowing the e-mail recipient to click the link and navigate to the link target 204. In a tighter security policy setting, however, external content can be blocked.

One method by which the present invention blocks the dereferencing of external content is by rewriting links to images which dereference external content as broken links to images. In this scenario, external image content, for example, is rendered in the browser as broken or unobtainable images. Different web browsers have different ways of indicating that content is unobtainable. Internet Explorer by Microsoft of Redmond, Washington, for example, shows a box with a red "X" through where the external content would be located in the case of images. In this scenario the links to images are broken and the e-mail recipient cannot navigate to the URL specified in the original link 510. One advantage of displaying broken links to images is that the alternative text associated with the image is displayed. Modifying the alternative text allows for display of an explanation to help the user understand why the link is broken.

Another method by which the present invention blocks the dereferencing of external content is by replacing the content and rewriting the link to be a link to the substituted content. In this scenario the HTML element that specifies the external content to be dereferenced is modified to instead specify a replacement image file 506 that can be stored on the server. Thus, when the e-mail client web browser 400 processes the in-line content of the HTML message and the HTML elements, rather than obtaining the external dereferencing content and rather than displaying a broken image element, the page displays a transparent image in the place of the external content. Additionally, the link can be rewritten to be a link to the transparent image within the body of the message.

As explained above when an e-mail message sent as HTML is rendered by the e-mail client, referenced external content and activated links will cause most browsers to include an HTTP Referer header on requests for that content. Since this optional header field allows the client to specify, for the server's benefit, the URL of the document (or element within the document) from which the URL in the request was obtained it is desirable to remove this information thus increasing e-mail privacy. The present invention provides a method in which an HTTP redirector service 504 is implemented which serves to eliminate the Referer header for the URL requested. In one embodiment the page can be implemented as a server-based link redirection evaluator page 504 within the architecture of Outlook Web Access by Microsoft of Redmond, Washington. In this scenario a Redir.ASP 504 file can be added to the /exchweb/bin directory and the MHTML to HTML converter 500 and Link Rewrite callback code 502 are modified to prepend links with /exchweb/bin/redir.asp?URL-{original-url}. The content of Redir.ASP may be very simple and can handle URL escaping if necessary to prevent cross-site scripting attacks. An exemplary Redir.ASP follows:

```
<% @ ENABLESESSIONSTATE=FALSE LANGUAGE=VBSCRIPT CODEPAGE=1252 %>
<%
Dim g_sURL
On error resume next
Response.Expires = –1
Response.CacheControl = "No-cache"
g_sURL = Request.QueryString ("URL")
if g_sURL = "" then
        g_sURL = Request.ServerVariables("HTTP_REFERER")
end if
if IsSafeUrl(unescape(g_sURL)) then
    g_sURL = "window.location = """ & EncodeJSBlock(g_sURL) & """"
else
    Response.Status = "403 Forbidden"
    Response.End
end if
Function GetTrustedProtocol(sUrl)
    Dim sProt, rgTrustedProtocols, iUrlLen, sUrlLowerCase
    rgTrustedProtocols = Array("http://", "https://", "ftp://", "file://", "file:\\", "mailto:", "news:")
    GetTrustedProtocol = Null
    sUrlLowerCase = LCase(sUrl)
    iUrlLen = Len(sUrlLowerCase)
    ' Check the URL to see that it starts with a valid protocol
    ' and make sure the URL is longer than just the protocol
    '
    For Each sProt in rgTrustedProtocols
        if InStr(sUrlLowerCase, sProt) = 1 and iUrlLen > Len(sProt) Then
            GetTrustedProtocol = Left(sUrl, Len(sProt))
            Exit Function
        end if
    Next
End Function
Function IsSafeUrl(sUrl)
    Dim sProtocol, sRedirHost, iSearchResult
    ' Default to being an unsafe URL
    '
    IsSafeUrl = False
    ' See if we have a trusted protocol or empty redirect path
    '
    sProtocol = GetTrustedProtocol(sUrl)
    if sProtocol = Null or sUrl = "" then
        Exit Function
```

```
end if
' If the protocol is HTTP or HTTPS then we need to verify
' that the host is not the host for this server
'
if sProtocol = "http://" or sProtocol = "https://" then
    ' url is formatted as such: <protocol><userinfo>@<host>:<port>
    ' we need to remove any parts that may be there so we
    ' just have the <host> part
    ' suppose I have http://foo@www.foobar.com/la/di/da
    ' this will give us foo@www.foobar.com:80/la/di/da
    '
    sRedirHost = Mid(sUrl, Len(sProtocol)+1)
    ' now just give me foo@www.foobar.com:80
    '
    iSearchResult = InStr(sRedirHost, "/")
    if iSearchResult > 0 then
        sRedirHost = Left(sRedirHost, iSearchResult - 1)
    end if
    'now get http://www.foobar.com/
    '
    iSearchResult = InStrRev(sRedirHost, "@")
    if iSearchResult > 0 then
        sRedirHost = Mid(sRedirHost, iSearchResult + 1)
    end if
    ' now just give me http://www.foobar.com/
    '
    iSearchResult = InStr(sRedirHost, ":")
    if iSearchResult > 0 then
        sRedirHost = Left(sRedirHost, iSearchResult - 1)
    end if
    if Len(sRedirHost) = 0 Then
        Exit Function
    end if
    ' If the host names are the same, url is unsafe
    ' This is to prevent people from sending URLs to a user that link
    ' to empty deleted items and other things you can do in OWA via
URLs
    '
    if LCase(sRedirHost) = LCase(Request.ServerVariables("HTTP_HOST"))
then
        Exit Function
    end if
end if
IsSafeUrl = True
End Function
Function EncodeJSBlock(sURL)
    sURL = Replace(sURL, "\", "\\")
    sURL = Replace(sURL, """", "\""")
    sURL = Replace(sURL, "'", "\'")
    sURL = Replace(sURL, "/", "\/")
    EncodeJSBlock = sURL
End Function
%>
```

An additional consideration regarding the Redir.ASP is that it should handle redirects to the same host name as the referrer (i.e., a link in e-mail cannot take the user back to his own server)—this is a security hole and should be failed with a "403 Forbidden".

In the "down-level" e-mail client embodiment, HTML modification is static, meaning that in order to "unblock" inline content for the particular message, it should be requested again from the server and filtered with a different policy. This can cause a different view of the message to be downloaded by the client.

IV. Blocking Web Beacons In a Client Which Can Make Programmatic Use of an HTML Rendering Engine In another embodiment, the method of the present invention provides for blocking web beacons in a client which can make programmatic use of an HTML rendering engine (e.g., a web-browser based client that uses downloaded binary controls for enhanced functionality). A client which can make programmatic use of an HTML rendering engine is one in which the e-mail client receives the complete unfiltered message in MIME format and the MIME parsing and HTML decoding takes place on the client side. In this architecture the server has no control over the content of a body rendered by the client. Thus, the browser's own object model can be used to parse and filter the HTML.

Figure 6:
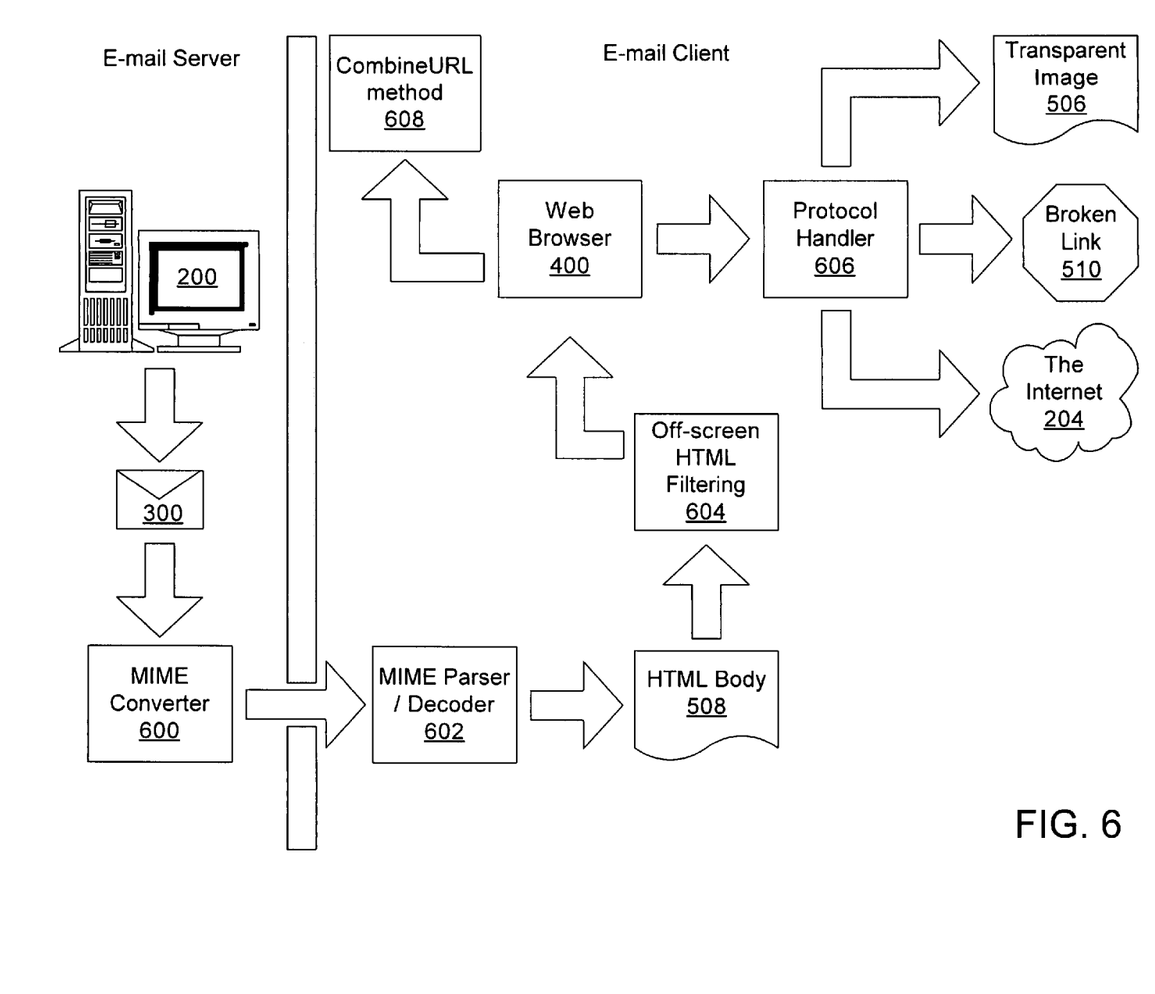
FIG. 6 is a data flow diagram illustrating the method of blocking dereferencing elements in a client which can make programmatic use of an HTML rendering engine.

Turning to FIG. 6, the method for blocking web beacons in a client which can make programmatic use of an HTML rendering engine is illustrated. The e-mail message 300 is stored on the e-mail server 200 in the message recipient's mailbox. The e-mail message is input to a MIME converter 600 on the server which converts the e-mail message to MIME format before downloading to the client. Once downloaded to the client, the message 300 is passed to a MIME parser and decoder 602 producing the HTML body 508. Before loading the HTML body 508 into a visible (i.e., "on-screen") window 400, an off-screen HTML parsing and rendering browser component 604 with a tight security settings is created. The HTML body 508 is loaded into this browser 604 and using the browser's HTML parsing and rendering object model the HTML body 508 is scanned for various attributes which may represent external links and these attributes are modified. The attributes can be grouped according to various levels of security and these groupings along with the policy settings can be used to determine which modifications should be made.

For example, a first group of attributes can be a set of "known safe" HTML elements/attributes which are those that are never automatically dereferenced by the web browser 400 while rendering the HTML. Because these attributes are never automatically dereferenced they can be safely passed through to the e-mail client web browser 400. An example of such an attribute is <A HREF="something"> link </A> which can be clicked by the user for hyperlink navigation; it requires explicit user action to be dereferenced.

A second set of attributes can be a set of "known unsafe" HTML elements/attributes which are those that are certainly automatically dereferenced by the web browser 400 while rendering the HTML. An example of such an attribute is the src="something" portion of <IMG src="something">. Because these attributes are certainly automatically dereferenced they can, in one embodiment, be modified to go through the protocol handler 606. A protocol handler is an object that handles any calls made to the protocol scheme for which it is registered. Depending on the current policy and link type, the protocol handler 606 can put the link through (i.e., redirect to the original URL) 204, break the link (i.e., return information that the resource is not available) 510, or redirect to the embedded transparent image 506. Additionally, there can be a set of "suspicious" HTML elements/attributes that potentially may or may not contain a link to external content and may or may not be automatically dereferenced. For this class of HTML attributes the value can be checked to determine if it contains a URL and in such a case it can be treated as the "known unsafe" case to be cautious.

Finally, it can be assumed that some links can be potentially missed while filtering the body 508. For example, as will be appreciated by one of ordinary skill in the art, HTML extensions like Vector Markup Language (VML) use many custom elements and attributes potentially having URL values and can be dereferenced automatically. There is no way of knowing in advance which of these types of elements/attributes are to be modified. Also, it can be assumed that the set of such extensions and the web browser itself are open in the sense that new extensions and/or HTML elements and attributes can be added in the future. In order to be able to control such "unknown" links the protocol handler architecture can be used. In most cases for Windows-based clients, in order to find an ultimate link target in the context of an HTML page, the URLMON.DLL calls the protocol handler's CombineURL method (combines a base and relative URL into a full URL) 608 providing it the base URL of the HTML page and the link text. This allows for detection of such "unknown" links when they are dereferenced and redirection of the links through the protocol handler to be acted upon according to the current policy. Unknown links are usually assumed to be inline to be cautious.

In view of the many possible embodiments to which the principles of this invention may be applied, it should be recognized that the embodiments described herein with respect to the drawing figures are meant to be illustrative only and should not be taken as limiting the scope of invention. For example, for performance reasons the method of the present invention may be implemented in hardware, rather than in software. Therefore, the invention as described herein contemplates all such embodiments as may come within the scope of the following claims and equivalents thereof.

What is claimed is:

1. A method for blocking dereferencing elements in a message, the method comprising:
   accepting a source file for the message;
   rendering the file in a first message display output;
   grouping one or more elements within the rendered message into security level groups;
   rewriting the elements to be processed through a protocol handler, wherein the processing of the elements by the protocol handler comprises redirecting to an alternate source file;
   passing the message source to a second message display output; and
   rendering the message in the second message display.

2. The method of claim 1 wherein the alternate source file is a transparent image file.

3. The method of claim 1 wherein the message source file is an HTML document.

4. The method of claim 1 wherein the first and second message displays are HTML rendering displays.

5. The method of claim 1 further comprising specifying a security policy setting, wherein the processing of the elements by the protocol handler is in accordance with the security policy setting.

6. A method for blocking dereferencing elements in a message, the method comprising:
   accepting a source file for the message;
   rendering the file in a first message display output;
   grouping one or more elements within the rendered message into security level groups;
   rewriting the elements to be processed through a protocol handler, wherein the processing of the elements by the protocol handler comprises returning information indicating that a target destination is not available;
   passing the message source to a second message display output; and
   rendering the message in the second message display.

7. The method of claim 6 wherein the first and second message displays are HTML rendering displays.

8. The method of claim 6 wherein the message source file is an HTML document.

9. The method of claim 6 further comprising specifying a security policy setting, wherein the processing of the elements by the protocol handler is in accordance with the security policy setting.

10. A method for blocking dereferencing elements in a message, the method comprising:
    accepting a source file for the message;
    identifying one or more elements within the message source file, wherein the elements specify references to sources of content to be dereferenced upon rendering of the message;
    rewriting the references to the sources of content of the elements identified in the message source, wherein the rewriting of the references to the sources of content comprises replacing the reference to the source of content with a reference to an alternate source file;
    passing the message source to a message display output; and
    rendering the message in the message display.

11. The method of claim 10 wherein the alternate source file is a transparent image file.

12. The method of claim 10 wherein the message source file is a Hypertext Mark-up Language (HTML) document.

13. The method of claim 10 wherein the message display is an HTML rendering display.

14. The method of claim 10 further comprising specifying a security policy setting, wherein the rewriting of the references to the sources of content is in accordance with the security policy setting.

15. A method for blocking dereferencing elements in a message, the method comprising:
- accepting a source file for the message;
- rendering the file in a first message display output;
- grouping one or more elements within the rendered message into security level groups;
- rewriting the elements to be processed through a protocol handler, wherein the processing of the elements by the protocol handler comprises returning information indicating that a target destination is not available;
- passing the message source to a second message display output;
- rendering the message in the second message display;
- combining a base Uniform Resource Locator (URL) and a relative URL into a full URL;
- passing the full URL to be processed to a protocol handler; and
- specifying a security policy setting, wherein the processing of the elements by the protocol handler is in accordance with the security policy setting.

16. The method of claim 15 wherein the processing of the elements by the protocol handler comprises redirecting to an alternate source file.

17. The method of claim 16 wherein the alternate source file is a transparent image file.

18. The method of claim 15 wherein the message source file is an HTML document.

19. The method of claim 15 wherein the first and second message displays are HTML rendering displays.

* * * * *